United States Patent [19]

Morton et al.

[11] Patent Number: 5,104,308

[45] Date of Patent: Apr. 14, 1992

[54] MOLD PLATE CONTROL MECHANISM FOR A MULTIPLE PLATE MOLD

[76] Inventors: Ray H. Morton, 3028 Michigan Pl., Loveland, Colo. 80537; Chris A. Morton, 13 Alabaster, Irvine, Calif. 92714

[21] Appl. No.: 490,487

[22] Filed: Mar. 8, 1990

[51] Int. Cl.$^5$ .............................................. B29C 45/66
[52] U.S. Cl. .................................. 425/589; 264/328.1; 425/451.4; 425/451.9; 425/592; 425/593; 425/595
[58] Field of Search ................. 425/589, DIG. 5, 592, 425/DIG. 221, 593, 595, 451.4, 451.9; 264/328.1

[56] References Cited

U.S. PATENT DOCUMENTS

| | | | |
|---|---|---|---|
| 2,972,777 | 2/1961 | Ghignatti | 425/451.4 |
| 3,706,116 | 12/1972 | Drazick | 425/450 |
| 4,718,845 | 1/1988 | Sheffield | 425/589 |

FOREIGN PATENT DOCUMENTS 1248839  8/1986  U.S.S.R. .......................... 425/451.3

OTHER PUBLICATIONS

Page K-36-37, D-M-E Standard Jiffy Latch-Lok Assemblies.
Two pages from a Torrington catalogue.

Primary Examiner—Timothy Heitbrink
Attorney, Agent, or Firm—Knobbe, Martens, Olson & Bear

[57] ABSTRACT

One aspect of the invention is a mechanism for controlling the movements of the plates in a multiple plate mold. The mold is secured to a press in an injection molding system having a support plate and top clamp plate. The mechanism includes a member pivotally mounted to the outside of the mold and an arm attaching the press support plate to the member. In a preferred embodiment, two guides are attached to the press top clamp plate and middle moving plate of a three plate mold. The guides travel in curved channels formed in the member to determine the relative positions of the plates.

15 Claims, 3 Drawing Sheets

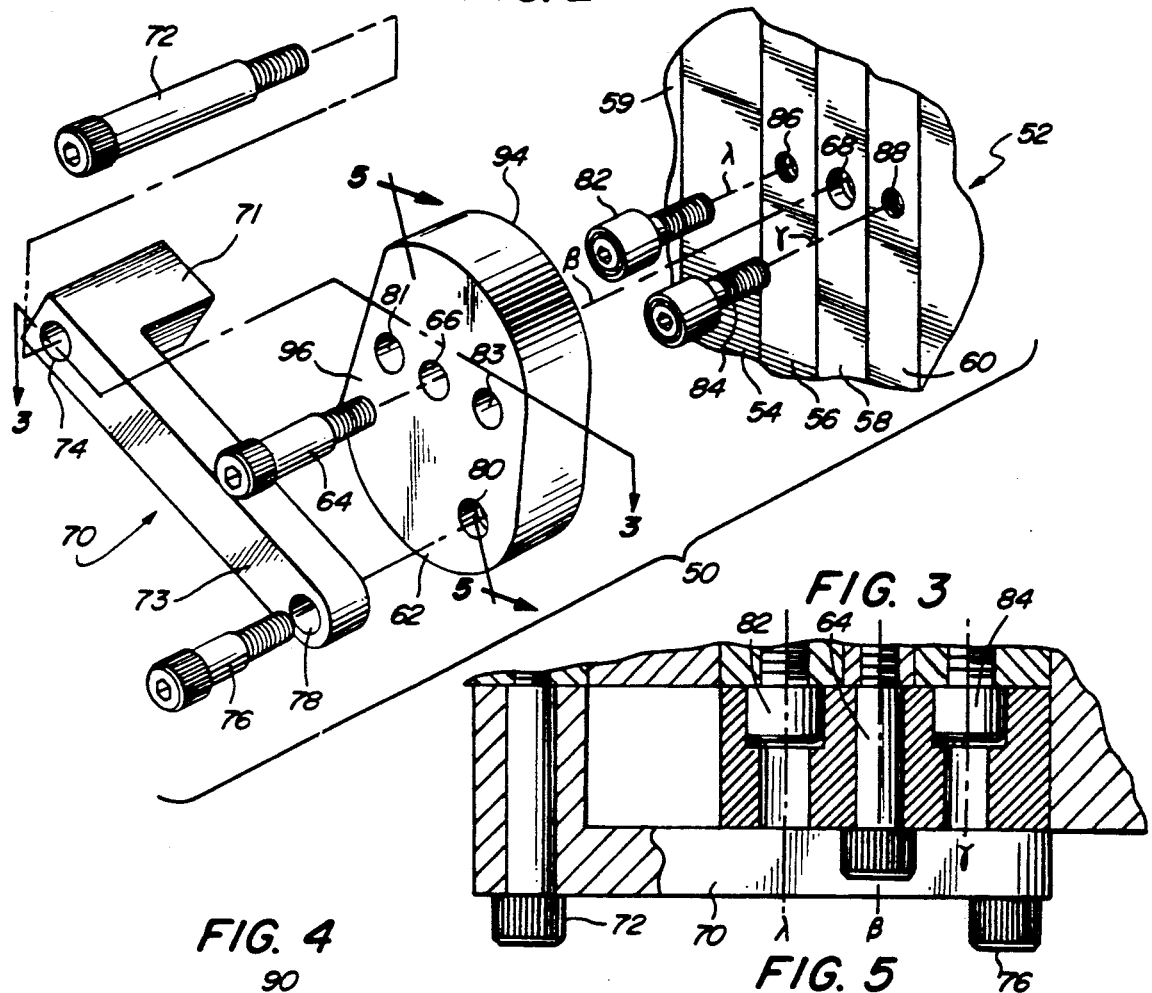

MOLD PLATE CONTROL MECHANISM FOR A MULTIPLE PLATE MOLD

FIELD OF THE INVENTION

The invention generally relates to control mechanisms in molding systems, and, in particular, to a mechanism used to control the movements of the plates of a multiple plate mold in an injection molding system.

BACKGROUND OF THE INVENTION

In numerous applications, it is desirable in injection molding to utilize molds with multiple plates. Traditionally, the movement of these plates has been controlled by strain linkage mechanisms attached to the plates. As the mold opens, the moving plates are picked up one at a time via the linkages. Springs positioned between the plates are also used to sequence the opening of the plates upon the opening of the mold. The springs are compressed when the mold is closed and expand when the mold is opened to effect lateral movement of the plates in the opening sequence.

While the springs and linkage mechanisms effectively sequence the movement of the plates, they do not restrict the movement of the plates and allow for some freedom of movement. This freedom of movement causes the plates to essentially "float" during operation as the mold is opened and closed. If the molding system is run at high clamp speeds (i.e., cycle), the acceleration of the floating plates increases to the point where the plates strike one another with considerable force, damaging the finely machined surface of the mold plates as well as the heads of the shoulder bolts which serve as the linkages connecting the plates. Due to machining costs, the molds themselves are highly expensive and typically cost in the range of $40,000 to $120,000 each. Thus, any damage incurred during the molding operation can easily result in several more thousands of dollars in labor costs to repair or replace the mold.

One of the reasons for the high cost of the molds is the size of the molds themselves, which must be designed to fit the springs and bolts into the given area. Most designs sacrifice the size of the mold, using larger molds to accommodate the size of the plate control mechanism. This, in turn, leads to the use of larger molding machines, producing a subsequent increase in the price of the finished product.

Even when the molds are run at low clamp speeds, the repeated impact between plates damages the bolt heads and system failure occurs often. The low clamp speeds at which the system must be run correspondingly limit the amount of parts which are produced. Consequently, the operating cost of the system is increased and must be passed on to the customer. Typically, the machine costs are approximately 60 percent of the total cost of the finished product in molds utilizing these types of plate control mechanisms.

To protect the mold, most injection molding machines have a low pressure safety system which prevents the closing of the mold when foreign materials are in the mold. Heretofore, this low pressure safety system could only be used in connection with two plate molds, in which the sequencing of the separation of the plates is unnecessary. In molds with springs used to sequence the moving plates, the force of the springs must be overcome to force the plates together and close the mold. In some molds, this can amount to as much as 2 tons of pressure. With the large amounts of pressure required to overcome the spring forces, the low pressure safety system is no longer effective and foreign material is often crushed between the mold plates, causing damage to the finely machined surfaces of the mold.

Thus, a need exists for a mold plate control mechanism which allows for the positive control and sequencing of moving plates in an injection molding system at high clamping rates. Furthermore, the need exists for a low cost mechanism of this type which can be used with a low pressure safety system.

SUMMARY OF THE INVENTION

The present invention provides a mechanism for controlling the movement of a least two plates in a multiple plate mold while the mold is secured to a molding machine including a fixed plate and a movable plate. The mechanism comprises a member defining a channel having a pair of opposing walls. A fastener rotatably secures the member to one of the plates so as to allow the member to rotate about an axis. A guide is secured to another of the plates, wherein the guide is received by the opposing walls of the channel. An arm is secured to the member for rotating the member about the axis in response to movement of the movable plate relative to the fixed plate, wherein the walls of the channel force the guide to move along the channel as the member rotates, thereby determining the relative positions of the plates.

In another aspect of the invention, a mechanism is provided for controlling the movement of a plurality of plates in a multiple plate mold. The mold includes a first plate, a second plate, and a third plate, wherein the second plate is positioned between the first and third plate. The mold is secured to a molding machine including a fixed platen and a movable platen. The mechanism comprises a member defining a first channel and a second channel. A fastener rotatably secures the member to one of the plates so as to allow the member to rotate about the axis. A first guide is secured to the third plate, wherein the first guide is received by the first channel of the member. The second guide is secured to the first plate, wherein the second guide is received by the second channel of the member. An arm is secured to the member for rotating the member about the axis in response to movement of the movable platen relative to the fixed platen, wherein the position of the guides within the channels determines the relative positions of the first plate, the second plate, and the third plate relative one another.

With the mechanism of the present invention, the mold can be operated at high clamping rates without any damage caused from free moving plates. The mechanism does not require any springs and can therefore be used with the low pressure safety systems present in most injection molding systems. Preferably, the mechanism incorporates few parts, and is thus economical and easy to install.

BRIEF DESCRIPTION OF THE DRAWINGS

FIG. 2 is a an exploded perspective view of the mold plate control mechanism of the present invention;

FIG. 3 is a cross-sectional view of the mechanism of FIG. 2 illustrating the mounting of the mechanism on the mold;

FIG. 4 is a plan view of the member of the mechanism of FIG. 2;

FIG. 5 is a sectional view of the member of FIG. 4 taken along line 5—5;

DETAILED DESCRIPTION

Prior Art

Figure 1:
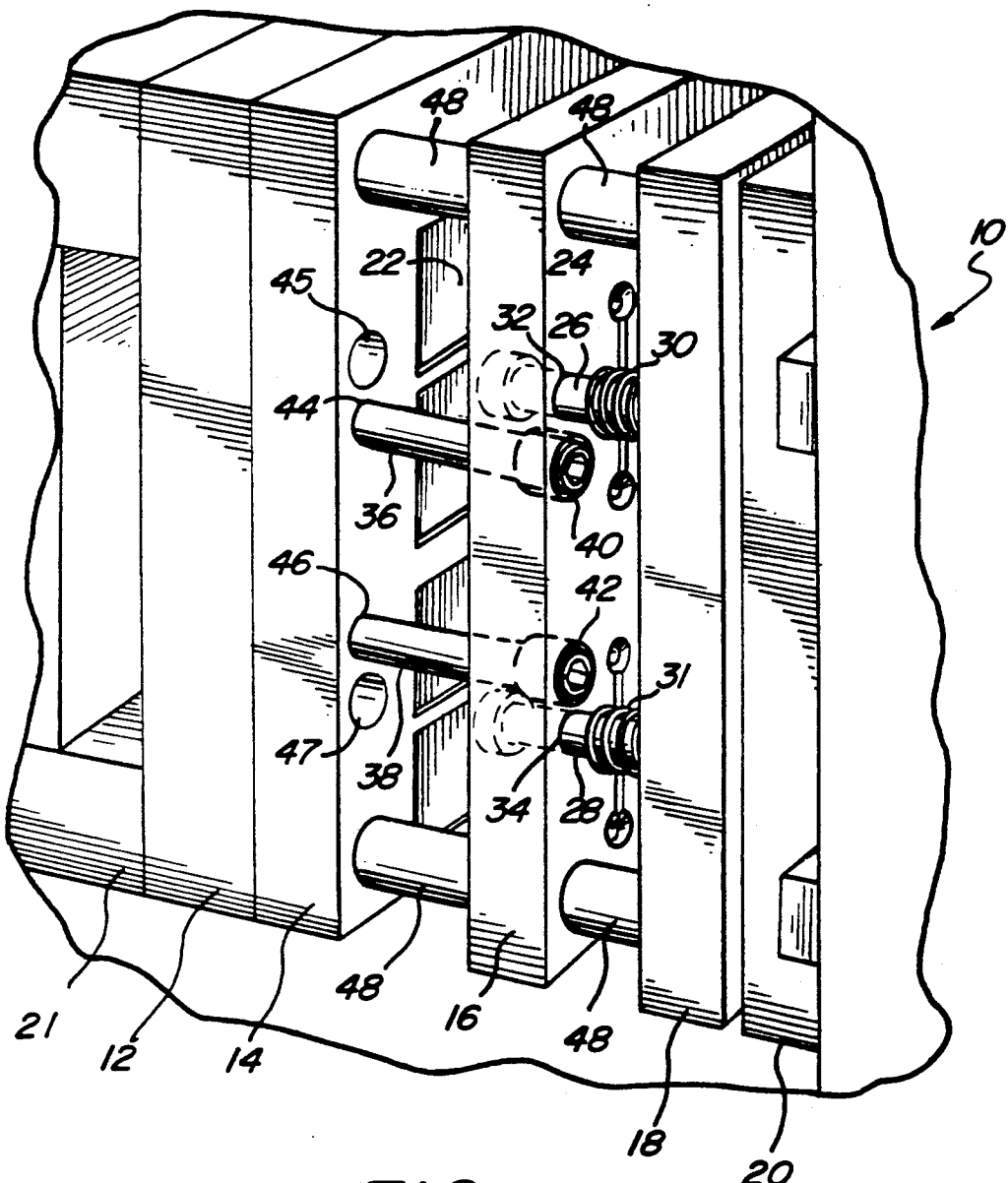
FIG. 1 is a perspective view of a prior art mold plate control mechanism.

It is desirable, for a full appreciation of the present invention, to provide the following more detailed description of multiple plate molds and the prior art used to control the sequencing of plates in these molds. FIG. 1 illustrates a three-plate multiple plate mold 10 of the type used in connection with injection molding systems. As is well known in the art, the mold 10 includes a B plate 14, an X plate 16, and an A plate 18. A mold pattern 22 is formed on the surface of the B plate 14 which faces the X plate 16 and a runner pattern 24 is formed on the surface of the X plate 16 which faces the A plate 18. The B plate 14 is bolted to a support plate 12. The support plate 12 is further secured to an ejector box or housing 21. The ejector box 21 is clamped to a movable plate or platen (not shown) of the molding machine. The A plate 18 is bolted to a top clamp plate 20 with two shoulder bolts (not shown) and clamped to a fixed plate or platen (not shown) of the molding machine. The mold and runner patterns 22, 24 are filled with heated plastic injected from a reservoir connected to the top clamp plate 20 during an injection process well known to those skilled in the art. When the plastic has cooled, the moving platen pulls the ejector box and associated support and B plates, away from the X plate, initiating the sequential opening of the mold plates 14, 16, 18 and the removal of the molded parts. In the embodiment illustrated, the mold pattern 22 is formed as a plurality of rectangles and the runner pattern 24 is formed as a series of circles and trapezoidal channels connected together in a weblike fashion, however, one skilled in the art will recognize that a variety of mold and runner patterns 22, 24 can be formed on the moving plates 14, 16 to produce many kinds of molded parts. A pair of shoulder bolts 26, 28, about which a pair of springs 30, 31 are mounted, attach the X plate 16 to the A plate 18. The shoulder bolts 26, 28 are mounted through holes 32, 34 in the X plate 16 into threaded holes (not shown) in the A plate 18 and have heads (shown in phantom) which are counterbored inside the X plate 16. The body of the bolts 26, 28 is unthreaded, permitting the X plate 16 to slide relative the A plate 18. Two clearance holes 45, 47 receive the heads of the bolts 26, 28 when the plates 14, 16, 18 are closed. Thus, the heads of the shoulder bolts 26, 28 limit the maximum distance between the X plate 16 and the A plate 18, but allow the free movement of the X plate 16 and the A plate 18 relative one another within this distance. Two other shoulder bolts 36, 38 function in a similar manner to attach the B plate 14 to the X plate 16. The heads (shown in phantom) of the bolts 36, 38 are mounted through holes 40, 42 in the X plate 16 into threaded holes 44, 46 inside the B plate 14 and have heads counterbored inside the X plate 16. Again, the body of the bolts 26, 28 is unthreaded, permitting the X plate to slide relative the B plate. Thus, the heads of the shoulder bolts 36, 38 limit the maximum distance between the X plate and the B plate, but allow the free movement of the X plate and the B plate relative one another within this distance. Two leader pins, generally designated 48, are also included to connect the plates 14, 16, 18, providing stability by carrying the weight of the plates 14, 16, 18 and aligning the plates 14, 16, 18 in the opening and closing sequences.

In the mold 10 illustrated, only one side of the linkage mechanism connecting the mold plates 14, 16, 18 is shown. The opposite sides of the plates 14, 16, 18 are a mirror image of those shown, i.e., the opposite sides of the plates 14, 16, 18 include six shoulder bolts, two springs, and two leader pins used to connect and sequence the plates 14, 16, 18. Thus, the linkage mechanism illustrated uses a total of twelve shoulder bolts, four springs, and four leader pins to connect and sequence the mold plates.

As the mold 10 opens, the B plate 14 and associated support plate 12 are pulled away and compression force is removed which causes the springs 30, 31 between the X plate 16 and the A plate 18 to begin to expand. As the springs 30, 31 expand, a force is created which compresses the X plate 16 against the B plate 14 and separates the X and A plates 16, 18 at a first parting line, breaking the runner free from the X plate 16, leaving the runner attached to the sucker pins. As the moving platen moves farther, the spring compression is overcome and the B plate 14 and support plate 12 move away from the X plate 16 creating a second parting line between the B plate 14 and X plate 16 and separating the molded part from the runner. Sucker pins (not shown) mounted in the top clamp plate 20 extend through the top clamp plate and A plate 16 to hold the runner in place while the B plate 14 and support plate 12 are moved away from the X plate 16 and the molded part falls. Near the end of the opening sequence, as the distance between the B plate and the A plate is roughly equal to the combined length of the shoulder bolts 36, 26, the separations between the B plate 14 and the X plate 16 and X plate 16 and the A plate 14 are at a maximum with the heads of the shoulder bolts 26, 28, abutting the clearance holes 32, 34 and the heads of the shoulder bolts 36, 38 abutting clearance holes (not shown) in the X plate 16 facing the B plate 14. Through the rest of the opening sequence, the shoulder bolts 26, 28, 36, 38 prevent movement of the B plate 14, X plate 16 and A plate 18 relative to one another. Further movement of the B plate 14 then acts to move the mold 10, and the A plate 18 moves away from the top clamp plate 20, separating the runner from the sucker pins and allowing the runner to fall between the X and A plates 16, 18.

During this opening sequence, the X plate 16 and A plate 18, which are initially at rest, pick up instantaneous acceleration as the support plate 12 and associated B plate 14 move away from the X plate 16. While the B plate 14 and the X plate 16 are separating, the shoulder bolts 36, 38 connecting the B and X plates 14, 16 are not fully extended, and thus, the X plate 16 is free to move back and forth between the B and A plates 14, 18, essentially "floating" between the plates 14, 18 along the shoulder bolts 36, 38 at the acceleration rate gained during the opening. Similarly, the A plate 18 "floats" between the X plate 16 and the top clamp plate 20 along the shoulder bolts 26, 28. Rapid clamp speeds will cause the X and A plates 16, 18 to gain acceleration sufficient enough to push the X or A plate 16, 18 into an adjacent mold plate, damaging the plates 14, 16, 18, 20 or the heads of the shoulder bolts 26, 28, 36, 38. Once the floating X plate or A plate 16, 18 has collided with an adjacent mold plate 14, 16, 18, 20, it can then rebound into another plate 14, 16, 18, 20 and cause further damage to the mold 10.

To reliably operate these types of systems, clamp opening and closing speeds must be relatively low to compensate for the lack of control over the moving plates and avoid the damage which can be incurred at high clamp speeds. Consequently, these low clamp speeds affect the productivity of the mold and result in higher machine costs. Typically, machine costs represent approximately 80 percent of the cost of a finished product using this type of mold.

However, even when run at low clamp speeds, some impact between the plates 14, 16, 18, 20 occurs because of the lack of plate control afforded by the shoulder bolts 26, 28, 36, 38 and springs 30, 31. The shoulder bolt heads cannot withstand the repeated impact between the plates 14, 16, 18, 20 and system failure occurs often, resulting in more time lost and higher production costs due to parts which must be repaired or replaced. Typically, the molds cost in the range of $40,000 to $120,000 and the cost of replacement or repair of mold plates represents a significant increase in production costs to the manufacturer.

To close the mold 10, the force of the springs 30, 31 positioned between the X and A plates 16, 18 must be overcome. For springs 30, 31 having ½ ton of spring force, this can result in approximately 2 tons of force which must be exerted to close the mold 10. Many molds are equipped with low pressure safety systems which act to shut off the closing sequence when foreign material is detected inside the mold 10. The approximate 2 tons of pressure required to close the mold 10 is significantly higher than the low pressure required by the safety system. Therefore, to operate the closing sequence, the safety system must be shut off leaving no protection against foreign materials. As a result, any foreign materials in the mold 10 are enclosed by the molding plates 14, 16, 18, 20, resulting in deformed parts produced by the mold 10, or if the material is large enough, damage to the machined surfaces of the molding plates 14, 16, 18, 20.

PREFERRED EMBODIMENT

Referring to FIG. 2 and FIG. 3, an assembly 50 for mold plate control is shown in accordance with the present invention. The assembly 50 is mounted to a standard three plate mold 52 having a B plate 54, X plate 56, and A plate 58. As is well known to those skilled in the art, a support plate 59 is bolted to the B plate 54 and secured to an ejector box or housing (not shown). The ejector box is clamped to a moving plate or platen (not shown) of a molding machine. A top clamp plate is positioned adjacent the A plate 58 and clamped to a fixed plate or platen (not shown) of the molding machine. A member or plate 62 is attached to the A plate 58 with a cylindrical fastener or a pivot pin 64. The pivot pin 64 is counterbored in a cylindrical bore 68 formed in the A plate 58. The fastener 64 prevents linear motion of the plate 62, but permits rotational movement about an axis of rotation $\beta$ and acts as the pivot of the plate 62. The plate 62 includes an inner face 94 mounted against the mold 52 and an outer face 96 facing away from the mold 52. The pivot pin 64 mounts through a cylindrical bore 66 in the plate 62 and attaches to the A plate 58 via a threaded hole 68 drilled in the A plate 58. The plate further includes two other cylindrical holes or alignment apertures 81, 83 formed on either side of the bore 66. An L-shaped plate drive link 70 having a base portion 71 and elongated portion 73 attaches to the plate 62 and the support plate 59, the B plate 54 or elsewhere on the moving side of the mold machine of the mold 52. A cylindrical fastener or drive pin 72 mounts through a cylindrical hole 74 in base portion 71 of the drive link 70 and attaches to a hole (not shown) in the support plate 59. A second cylindrical fastener or connecting pin 76 mounts through a hole 78 in the distal end of the elongated section 73 of the drive link 70 and attaches to a threaded hole 80 at the bottom of the plate 62. Both pins 72, 76 act to prevent linear motion but permit rotational movement. An X plate guide or bearing 82 having an axis $\lambda$, is mounted in a threaded hole 86 in the X plate 56. An A plate guide or bearing 84 having an axis $\gamma$ is mounted in a threaded hole 88 in the top clamp plate 60.

As shown in FIG. 4 and FIG. 5, an arcuate X plate track or channel 92 having a pair of opposing walls formed in the inner face 94 of the plate 62 receives the bearing 82 and slides relative thereto. Likewise, an arcuate A plate track or channel 90 having a pair of opposing walls formed in the inner face 94 of the plate 62 receives the A plate bearing 84 and slides relative thereto. The A plate channel 90 which slides relative the A plate bearing 84 moves has a first radius 98 and center point 99 and the X plate channel 92 which slides relative the X plate bearing 82 moves has a second radius 100 and center point 101. Both channels 90, 92 have a width W. The outer face 96 of the plate 62 generally covers the channels 90, 92 so as to prevent particulate from entering the channels 90, 92 and damaging the bearings 82, 84. As described above, the bearings 82, 84 are mounted to the stationary support plate 59 and moving A plate 58. Thus, when the mold 52 opens, the drive link 70 is moved rotating the plate 62, thereby moving the plates 56, 58, 60 in a controlled sequence. As explained hereinafter, the plates 56, 58, 60, are controlled positively and sequenced in the mold opening and mold closing sequences.

The mold opening process is illustrated sequentially in FIGS. 6a through 6d. In the closed position shown in FIG. 6a, the mold plates 54, 56, 58 are closed to allow the mold 52 to be filled and cooled. The pivot pin 64 and the bearings 82, 84 which slide relative the channels 90, 92 are horizontally aligned, i.e., the axis of the bearings 82, 84 and the pivot pin 64 are parallel to one another and coplanar. The apertures 81, 83 advantageously allow adjustment, such as tightening or loosening, of the bearings 82, 84 without requiring time consuming removal of the plate 62.

Figure 6B:
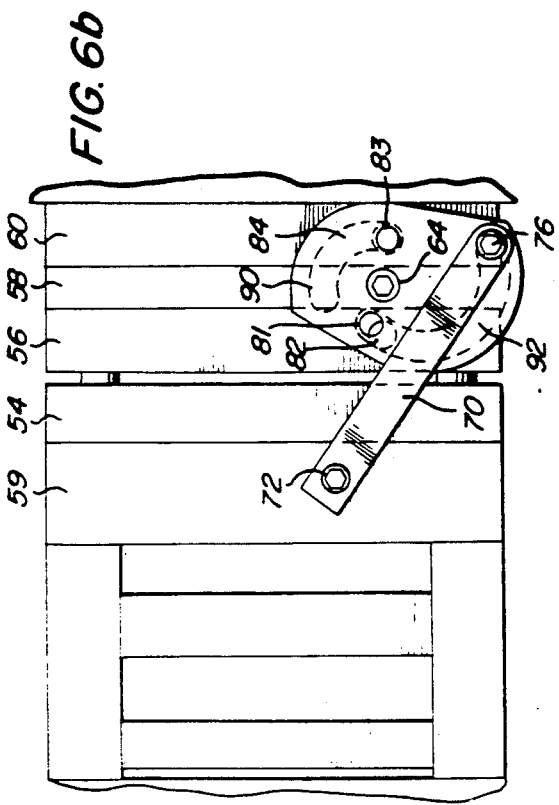
FIGS. 6a-6d are schematic elevation views illustrating the opening sequence of a multiple plate mold utilizing the plate control mechanism of the present invention.
Figure 6D:
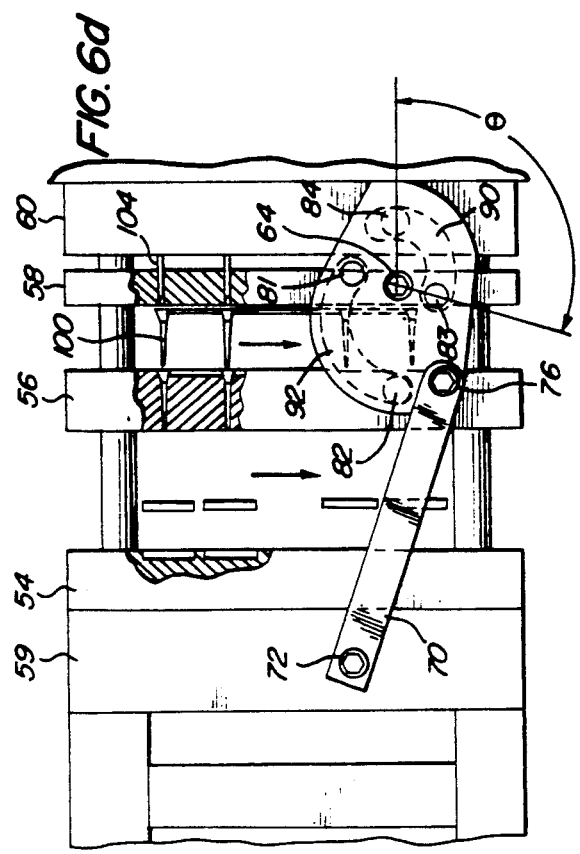
Figure 6A:
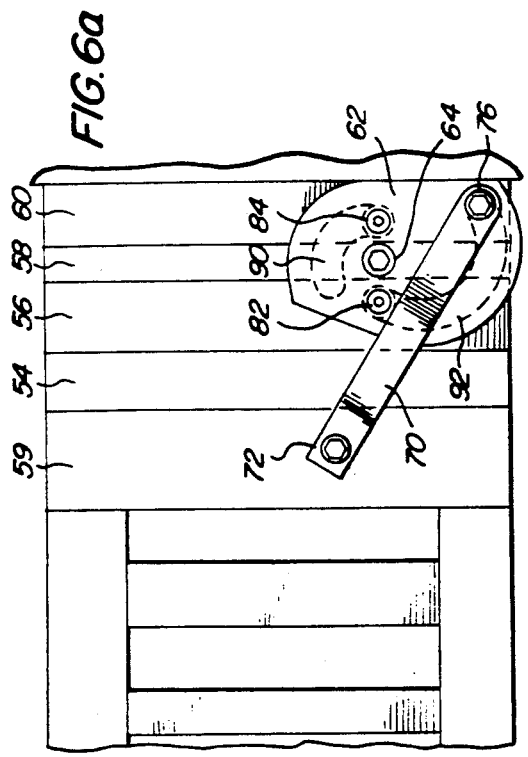

The drive link 70 is mounted on the plate 62 and support plate so that desired separation between the B plate 54 and X plate 56 is achieved when the plate 62 has rotated roughly the length of the channels 90, 92 (FIG. 6d). In addition, when the plate 62 is rotated clockwise and the plates 54, 56, 58, 60 have fully separated, the drive link 70 must have enough downward angle so that the plate 62 will rotate counterclockwise when the plates 54, 56, 58, 60 are closed and return to its original position. If the drive link 70 is mounted incorrectly on the plate 62, the drive link will be almost horizontal or upwardly inclined when the plates are opened and force applied to the plates to close the plates will continue to rotate the plate 62 clockwise. Further rotation of the member in the clockwise direction will damage the member and bearings and result in machine failure. Preferably, the drive link is mounted in a cylindrical hole 5/16 inches in diameter and 1.125 inches deep located 6 inches from the edge of the top clamp plate 60.

The drive link 70 has a preferred length of 7.47 inches and width of 2 inches at the base portion 71 and 0.495 inches at the elongated section 73 for the mold 52 illustrated, although, one skilled in the art will recognize that this measurement, as well as all other measurements specified, are illustrative only and will vary for individual molds having different plate thickness and plate separation requirements.

As the mold 52 is opened from right to left as illustrated in FIG. 6b by the molding machine, the support plate is moved laterally, pulling on the plate drive link 70 attached via the drive pin 72. The movement of the drive link 70 causes the plate 62 to rotate slightly about the pivot pin 64 and the respective channels 90, 92 to slide relative their respective bearings 82, 84. At this point, the rotation of the plate 62 is so small that the only significant separation between the plates 54, 56, 58 and 60 is between the B plate 54 and the X plate 56, resulting from the support plate 59 and the B plate 54 being physically secured to one another so that the movement of the support plate 59, to the left causes the B plate 54 to be pulled to the left. Since the X plate 56 is not secured to the B plate 54, there is no impetus for the movement of the X plate and thus the X plate remains at rest, creating a first parting line between the B plate and the X plate.

Figure 6C:
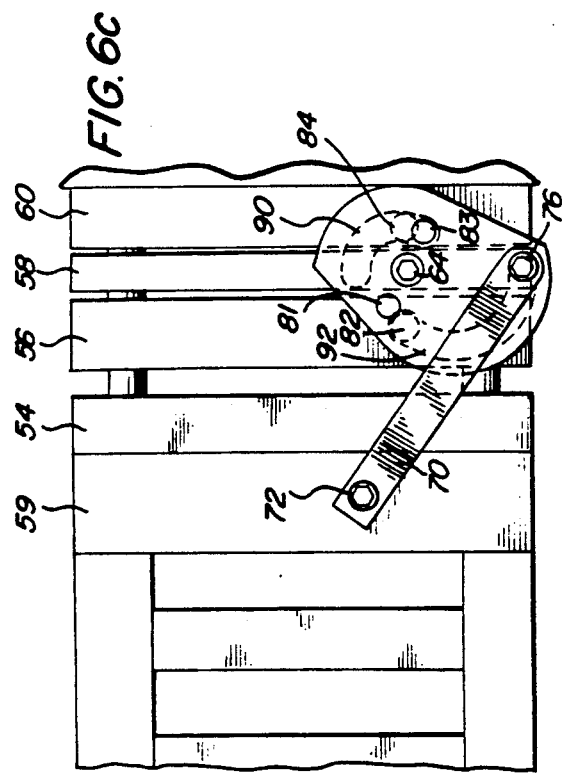

Further movement of the support plate rotates the plate 62 via the drive link 70 to the position shown in FIG. 6c. At this point, the clockwise rotation of the plate 62 causes the walls of the X plate channel 92 to slide along and press against the X plate bearing 82 causing the continuous positively controlled physical separation of the X plate 56 and the A plate 58 creating, creating a second parting line between the X plate 56 and the A plate 58. Furthermore, the clockwise rotation of the plate 62 causes the walls of the A plate channel 90 to slide along and press against the A plate bearing 84, causing the continuous positively controlled physical separation of the A plate 58 and the clamp plate 60, creating a third parting line.

When fully opened, the channels 90, 92 are in the positions shown in FIG. 6d. The X plate bearing 82 mounted to the X plate 56 is positioned against the end of the A plate channel 90, 92, preventing the further clockwise rotation of the plate, just above the connecting pin 76 attaching the drive link 70 to the plate 62. Correspondingly, the A plate bearing 84 mounted to the top clamp plate 60 is positioned at the end of the A plate channel 90. The top clamp plate 60 is now separated far enough from the A plate 58 to pull the runner off of sucker pins 104. The distances between the B plate 54 and the X plate 56 are also wide enough for the part 98 to fall through and the distance between the X plate 56 and the A plate 58 is great enough for the runner 100 to fall through.

The holes 74, 78 formed in the drive link 70 to accommodate the fasteners 72, 78 are formed with centers at 0.5 inches and 6.97 inches, respectively, away from the flat elongate edge of the drive link 70 and have diameters of 0.502 inches. The holes 86, 88 in which the bearings 82, 84 are mounted in the plates are preferably 0.332 inches in diameter and 1.125 inches in depth, with 0.002 inches in tolerance. The holes 86, 88 are preferably located at 2.750 and 0.875 inches from the top clamp plate 60, respectively. The hole 68 in which the pivot pin 64 mounts is preferably formed 1.812 inches away from the edge of the top clamp plate 60. All three cylindrical holes 68, 86, 88 are formed at a height of 3.125 inches above the bottom of the plates.

Referring to FIG. 3 and FIG. 5, the radii 198, 200 of the channels 90, 92 are derived from the separation distances desired between the moving plates 56, 58, 60. With the mold plates 56, 58, 60 closed, the pivot pin 64 is mounted in the center of the A plate 58. The bearings 82, 84 are positioned on the X plate 56 and top clamp plate 60 in horizontal alignment (coplanar and parallel to) with and as close to the pivot pin 64 as possible, leaving, of course, sufficient space between the pivot pin 64 and the bearings 82, 84 that the walls of the channels 90, 92 are wide enough to avoid being fatigued during operation. The position of the bearings 82, 84 with the plates 56, 58, 60 closed defines a starting point for each channel 90, 92 and a radius R between the center of the pivot pin 64 and the center of each bearing 82, 84. When the plates 56, 58, 60 are open to their desired maximum separations, the pivot pin 64 has rotated some angle $\theta$ (FIG. 6d), from a starting position of 0 degrees with the plates closed, wherein the value of $\theta$ is directly dependent upon the separation distances between the plates 56, 58, 60.

For each arc, the desired separations between the plates gives the radius R' at the end of each channel 90, 92 from the central axis $\beta$ of the pivot pin 64 to the central axis $\lambda$, $\gamma$ of the associated bearing 82, 84. The distance between the axis $\beta$ of the pivot pin 64 and the axis of the top clamp plate bearing 84 in the closed position (FIG. 6a) plus the desired maximum separation distance between the top clamp plate 60 and the A plate 58 is equal to the distance between the axis of the pivot pin 64 and the axis of the top clamp plate bearing 84 at the maximum separation position (FIG. 6d). Likewise, the distance between the axis $\beta$ of the pivot pin 64 and the axis of the X plate bearing 82 in the closed position plus the desired separation between the X plate 56 and the A plate 58 is equal to the distance between the axis $\beta$ of the pivot pin 64 and the axis of the X plate bearing 82 in the maximum separation position.

Once the above data has been determined, the desired opening sequence is considered. For each arc, the beginning point of movement of the associated plate is empirically determined. For example, the desired moment in the opening sequence at which the X plate 56 and A plate 58 begin to separate is empirically located. At this point, the pivot pin 64 has rotated an angle $\omega$ from its initial position at 0 degrees with the plates closed, and the distance between the center of the pivot pin 64 and the center of the bearing 82 is still R. This point and angle of separation define a third point of the arc. Thus, three points of each arc, the beginning, end, and beginning separation points are known. Three points are generally known to define a single continuous radius arc, therefore, once these points are located, the arc defining the channel 92 in which the bearing 82 is located can be determined. In a similar manner, the third point of the arc defining the channel 90 in which the bearing 84 is located can be determined.

An arc of constant radius is unexpectedly desirable to reduce the side loads on the bearings 82, 84 as they slide relative to the channels 90, 92, thereby reducing the shear and stress forces on the bearings 82, 84 and increasing the longevity and durability of the mechanism. Although, obviously an arc having a varying radius of curvature will function to move the plates 54, 56, 58, 60 in the proper sequence, experience has shown that if the radius is changed over the length of the channels 90, 92 forming sharp turns or angles, the side loads on the bearings 82, 84 will be too great and the bearings 82, 84 will break under the force.

The channels 90, 92 are formed in the inner face 94 of the plate 62 using the arcs determined in the above described process. The largest arc travelling through the starting and end points of each X plate bearing 82, 84 is laid across the plate 62 and its center and radius are determined The radius of each arc is then adjusted by subtracting the width of a safety margin on the edges of the plate 62. The safety margin is necessary to ensure that the walls or sides of the channels 90, 92 have sufficient strength and support and will not become fatigued during operation. The final radius 98, 100 of the arc in the middle of each A plate channel 90, 92 is then determined by subtracting the half the width W of the A plate channel 90, 92.

In the preferred embodiment, the channels 90, 92 desirably have width W greater than 0.5 inches to accommodate the width of the bearings 82, 84 and are preferably formed having a width W of 0.756 inches. The radius 98 of the A plate channel 90 is preferably 1.031 inches and has a center point 99 located 0.094 inches to the right of and 0.188 inches above the center of the cylindrical bore 66. The radius of the X plate channel 92 is preferably 1.500 inches with a center point 101 located 0.282 inches to the left of and 0.969 inches below the center of the cylindrical bore 66. The safety margin of the A plate channel 90, i.e., the distance between the edge of the plate 62 and the side wall of the A plate channel 90, is preferably 0.844 inches. The safety margin between the plate 62 and the X plate channel 92 is preferably 0.656 inches. The dimensions of the channels 90, 92 have tolerances within 0.005 inches.

The bearings 82, 84 are preferably 0.5 inches in diameter and ⅝ inches in length with thread length of ⅜ inches and 16 threads per inch and can be purchased as a track roller from Torrington, designation CRS-8-1. The thickness (i.e., the distance between the inner face and outer face) of the plate 62 is preferably 1.5 inches with the channels 90, 92, 0.625 inches in depth to provide sufficient strength to withstand the shear and stress forces produced by the bearings 82, 84 as they move within the channels 90, 92. The plate 62 is also significantly thicker than the depth of the channels 90, 92 to advantageously cover the channels with the outer face 96 of the plate 62, thus preventing dust and dirt from entering the channels 90, 92 and damaging the bearings 82, 84.

The plate 62 is preferably formed of P20 prehardened steel, 32 Rockwell. As shown, the shape of the plate 62 is irregular. The plate 62 is curved on two sides and configured to follow the shape of the channels 90, 92, providing the safety margin for the channels 90, 92 as described above. The remaining two sides are generally flat and shaped such that the plate 62 does not extend far beyond the bottom of the plates 54, 56, 58, 60 or past the top clamp plate 60, where it could possibly interfered with other parts of the molding machine. The elongate portion 73 of the drive link 70 is rounded to conform to the shape of the plate 62. In this manner, the drive link 70 does not extend beyond the plates 54, 56, 58, 60 and inhibit the operation of the associated molding machine.

In the preferred embodiment, the shoulder bolt 76 which attaches the drive link to the plate 62 has diameter of ½ inch and length of ¾ inches, the length measured from under the head to the point where the threads begin. The shoulder bolt 72 attaching the drive link 70 to the support plate measures ½ inch in diameter and has a length of 2¼ inches, again measured from under the head to the threaded portion. The shoulder bolt 64 attaching the plate 62 to the A plate 58 measures ½ in diameter and 1¾ inches in length from the head to the threads. The bolt 64 is counterbored 1/16 inches into the bore 66 to provide increased stability against the shear and rotational forces exerted on the bolt. All three shoulder bolts 64, 72, 76 have ⅜ inch long threads with 16 threads per inch. The preferred dimensions of the shoulder bolts 64, 72, 76 used have been determined through experience to be the minimum dimensions which will withstand the rotational, shear, and stress forces of the opening and closing sequences while providing longevity and durability. Smaller dimensioned bolts have been used and have been found unable to sustain the wear and tear, often breaking due to the forces applied in operation.

The mechanism 50 of the present invention allows the mold 52 to be operated at high clamp rates without any damaging contact between the plates 54, 56, 68, 60 in the opening sequence. The shapes of the channels 90, 92 formed in the plate 62 act to effectively change the relative positions between the plates 54, 56, 58, 60 at any time in the opening sequence, thus providing positive control of the plates 54, 56, 58, 60 throughout the molding process. Furthermore, the mechanism 50 is easy to install on the mold 52 and has relatively few parts, thus reducing cost and increasing durability. Since the mold 52 can be run at high clamp rates, significant increases in production rates are realized which correspondingly lowers the cost of components. The use of the assembly 50 in the mold 52 illustrated decreased opening sequence cycle time, i.e., the amount of time for the mold 52 to be opened and closed, from 25 seconds down to 8 seconds. One skilled in the art will recognize that total cycle time reduction will directly depend upon the cooling, injection, and moving times of the molding sequence and will vary for each particular mold configuration.

Although the plate control mechanism described above has been illustrated utilizing one member to control plate movement, one skilled in the art will recognize that two or more plates, one positioned on each end or side of the plates, could be used to more exactly and precisely control the movements of the plates in this type of injection molding system.

We claim:

1. A multiple plate mold comprising:
    a first plate;
    a second plate;
    a third plate wherein said third plate is directly adjacent one of said first plate and said second plate;
    a member defining a channel, said channel defining a pair of opposing walls;
    a fastener rotatably securing said member to said first plate so as to allow said member to rotate about an axis;
    a guide secured to said second plate, wherein said guide is received between said opposing walls of said channel of said member; and
    an arm secured to said member for rotating said member about an axis, wherein said walls of said channel force said guide to move along said channel as said member rotates, thereby positioning said first plate and said second plate relative one another, such that the distance between said first plate and said second plate, the distance between said first plate and said third plate, and the distance between said second plate and said third plate changes.

2. The multi plate mold of claim 1, wherein the walls of said channel have a constant radius of curvature.

3. The multi plate mold of claim 2, wherein said member further comprises an inner face and an outer face, said outer face generally covering said channel so as to prevent particulate from entering the channel and damaging said guide.

4. The multiple plate mold of claim 1, wherein said first plate and said second plate are in contact when said mold is in a closed position, and wherein there is a distance between said axis of rotation and said guide when said first plate and said second plate are at a position of greatest separation, there is a distance between said axis of rotation and said guide when said first plate and said second plate are in contact, there is a distance between said first plate and said second plate when said first plate and said second plate are at said position of greatest separation and there is a difference between the distance from said axis of rotation to said guide in said channel when said first plate and said second plate are at said position of greatest separation and the distance from said axis of rotation to said guide in said channel when said first plate and said second plate are in contact, and wherein further said channel is shaped and is positioned on said member such that the difference between the distance from said axis of rotation to said guide in said channel when said first plate and said second plate are at said position of greatest separation and the distance from said axis of rotation to said guide in said channel when said first plate and said secon dplate are in contact is equal to the distance between said first plate and said second plate at said position of greatest separation.

5. The multi plate mold of claim 4, wherein the walls of said channel have a constant radius of curvature.

6. The multi plate mold of claim 5, wherein said member further comprises an inner face and an outer face, said outer face generally covering said channel so as to prevent particulate from entering the channel and damaging said guide.

7. A mechanism for controlling movement of a multiple plate mold while said mold is secured to a molding machine, said molding machine including a fixed platen and a movable platen, said multiple plate mold including a first plate, a second plate and a third plate, wherein said second plate is positioned between said first plate and said third plate, said mechanism comprising:
   a member defining a first channel and a second channel;
   a fastener rotatably securing said member to said mold so as to allow said member to rotate about an axis;
   a first guide secured to said third plate, wherein said first guide is received by said first channel of said member;
   a second guide secured to said first plate, wherein said second guide is received by said second channel of said member; and
   an arm secured to said member for rotating said member about said axis in response to movement of said movable platen relative to said fixed platen, wherein said first plate, said second plate, and said third plate are positioned relative one another by said guides within said channels.

8. The mechanism defined in claim 7, wherein said arm is further secured to one of said first plate, said second plate and said third plate which is fixed in relationship to said moving plate.

9. The mechanism defined in claim 7, wherein said first channel is curved and has a constant radius of curvature, and wherein said second channel is curved and has a constant radius of curvature.

10. The mechanism defined in claim 9, wherein said guides comprise bearings.

11. The mechanism of claim 7, wherein said member further comprises an inner face and an outer face, said outer face generally covering said channels so as to prevent particulate from entering said channels and damaging said guides.

12. The mechanism of claim 8, wherein said second plate and said third plate are in contact when said mold is in a closed position, and wherein there is a distance from said axis of rotation to said first guide in said first channel when said second plate and said third plate are at a position of greatest separation, there is a distance from said axis of rotation to said first guide in said first channel when said second plate and said third plate are in contact, there is a distance between said second plate and said third plate at said position of greatest separation, and there is a difference between the distance from said axis of rotation to said first guide in said first channel when said second plate and said third plate are at said position of greatest separation and the distance from said axis of rotation to said first guide in said first channel when said second plate and said third plate are in contact, and wherein further said first channel is shaped and is positioned on said member such that the difference between the distance from said axis of rotation to said first guide in said first channel when said second plate and said third plate are at said position of greatest separation and the distance from said axis of rotation to said first guide in said first channel when said second plate and said third plate are in contact is equal to the distance between said second plate and said third plate at said position of greatest separation.

13. The mechanism of claim 12, wherein said second channel is shaped and is positioned on said member such that the difference between the distance from said axis of rotation to said second guide in said second channel when said first plate and said second plate are at their point of greatest separation and the distance from said axis of rotation to said second guide in said second channel when said first plate and said second plate are in contact is equal to the distance between said first plate and said second plate at their point of greatest separation.

14. The mechanism defined in claim 13, wherein said first channel is curved and has a constant radius of curvature, and wherein said second channel is curved and has a constant radius of curvature.

15. The mechanism of claim 14, wherein said member further comprises an inner face and an outer face, said outer face generally covering said channels so as to prevent particulate from entering said channels and damaging said guides.

* * * * *

UNITED STATES PATENT AND TRADEMARK OFFICE
CERTIFICATE OF CORRECTION

PATENT NO. : 5,104,308

DATED : April 14, 1992

INVENTOR(S) : Morton, et al.

It is certified that error appears in the above-indentified patent and that said Letters Patent is hereby corrected as shown below:

Column 11, Line 6, change "The multi plate mold" to --The multiple plate mold--;

Column 11, Line 8, change "The multi plate mold" to --The multiple plate mold--;

Column 11, Lines 35 & 36, change "said secon dplate are" to --said second plate are--;

Column 11, Line 39, change "The multi" to --The multiple--;

Column 11, Line 41, change "The multi" to --The multiple--;

Column 12, Line 7, change "said moving plate" to --said moveable platen--.

Signed and Sealed this

Ninth Day of September, 1997

Attest:

BRUCE LEHMAN

Attesting Officer

Commissioner of Patents and Trademarks